United States Patent
Uchiyama

[11] Patent Number: 5,900,601
[45] Date of Patent: May 4, 1999

[54] LEVER SWITCH FOR A VEHICLE INCLUDING GUIDE ARMS WITH INSTABILITY PREVENTING PROTRUSIONS

[75] Inventor: Norio Uchiyama, Tokyo, Japan

[73] Assignee: Niles Parts Co., Ltd., Japan

[21] Appl. No.: 08/988,217

[22] Filed: Dec. 10, 1997

[30] Foreign Application Priority Data

Dec. 11, 1996 [JP] Japan .................................... 8-346569

[51] Int. Cl.[6] .............................. H01H 9/00; H01H 3/16
[52] U.S. Cl. ..................................... 200/61.27; 200/61.54
[58] Field of Search ........................... 200/61.27–61.38, 200/61.54–61.57, 553–562, 4, 6 A, 17 R, 332, 335

[56] References Cited

U.S. PATENT DOCUMENTS

| | | | |
|---|---|---|---|
| 4,393,280 | 7/1983 | Iwata et al. | 200/4 |
| 5,804,784 | 9/1998 | Uchiyama et al. | 200/61.54 |
| 5,831,231 | 11/1998 | Uchiyama | 200/61.54 |

FOREIGN PATENT DOCUMENTS 3-301326  3/1991  Japan .

*Primary Examiner*—J. R. Scott
*Attorney, Agent, or Firm*—Rader, Fishman & Grauer; Ronald P. Kananen

[57] ABSTRACT

A lever switch that includes a manipulation lever 5 supported pivotably around a shaft in a case 18, first, second and third movable pieces 17, 25, 26 carrying movable contacts 30, 32, 34 moved by pivoting manipulation of the manipulation lever 5; and a pole plate 27 having a plate surface 27a with fixed contact plates 35a on which the movable pieces 17, 25, 26 are slid. The case 18 includes a partition 18c, and sliding grooves 18a are formed on a lower surface of the partition 18c in a direction in which the second movable piece 25 is moved. Guide arms 25b engaged with the sliding grooves 18a are formed on the second movable piece 25. Instability preventing protrusions 25d, which are in sliding contact with inner walls of each of the sliding grooves 18a, are formed on each of the guide arms 25b. The lever switch thus has movable pieces that have no instability

6 Claims, 5 Drawing Sheets

LEVER SWITCH FOR A VEHICLE INCLUDING GUIDE ARMS WITH INSTABILITY PREVENTING PROTRUSIONS

BACKGROUND OF THE INVENTION

1. Field of the Invention

The present invention relates generally to lever switches and, in particular, to a construction of a lever switch for a vehicle that prevents instability of a movable piece joined with a pivoting mechanism of a manipulation lever of the switch.

2. Description of the Related Art

A conventional lever switch for a vehicle is disclosed, for example, in Japanese Patent Publication No. JP-A-Hei 3-201326. The conventional lever switch has a guide portion formed therein, which guides a movable contacting piece in a movement direction The movable contacting piece is formed so as to move smoothly in the movement direction owing to the fact that the guide portion is engaged with an engaging groove formed in a case.

However, the movable contacting piece of the prior art lever switch described above has a problem in that instability is produced because the movable contacting piece is short in the movement direction.

SUMMARY OF THE INVENTION

An object of the present invention is to provide a construction of a lever switch for a vehicle that solves the problems associated with the conventional lever switch construction described above.

More specifically, an object of the present invention is to provide a lever switch for a vehicle that has a movable piece joined with a manipulation lever, wherein the movable piece has no instability.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems described above, a lever switch for a vehicle is provided, comprising a manipulation lever supported pivotably around a shaft in a case; a movable piece moved by pivoting manipulation of the manipulation lever; and a pole plate having a plate surface on which the movable piece is slid; wherein a partition is disposed within the case, sliding grooves are formed in a lower surface portion of the partition in a direction in which the movable piece is moved, and guide arms engaged with the sliding grooves are formed on the movable piece.

According to yet another aspect of the present invention, instability preventing protrusions, which are in slidable contact with inner walls of each of the sliding grooves, are formed in each of the guide arms.

According to another aspect of the present invention, a lever switch for a vehicle is provided, comprising: a manipulation lever supported pivotably around a shaft in a case; a movable piece moved by pivoting manipulation of the manipulation lever; and a pole plate having a plate surface on which the movable piece is moved; wherein a guide hole (27c) is formed in a portion of the plate surface (27a) of the pole plate (27) in a direction in which the movable piece (25) is moved, and guide protrusions engaged with the guide hole are formed in the movable piece.

BRIEF DESCRIPTION OF THE DRAWINGS

The present invention will become more clearly appreciated as the disclosure of the invention is made with reference to the accompanying drawings. In the drawings.

DETAILED DESCRIPTION OF THE INVENTION

Figure 1:
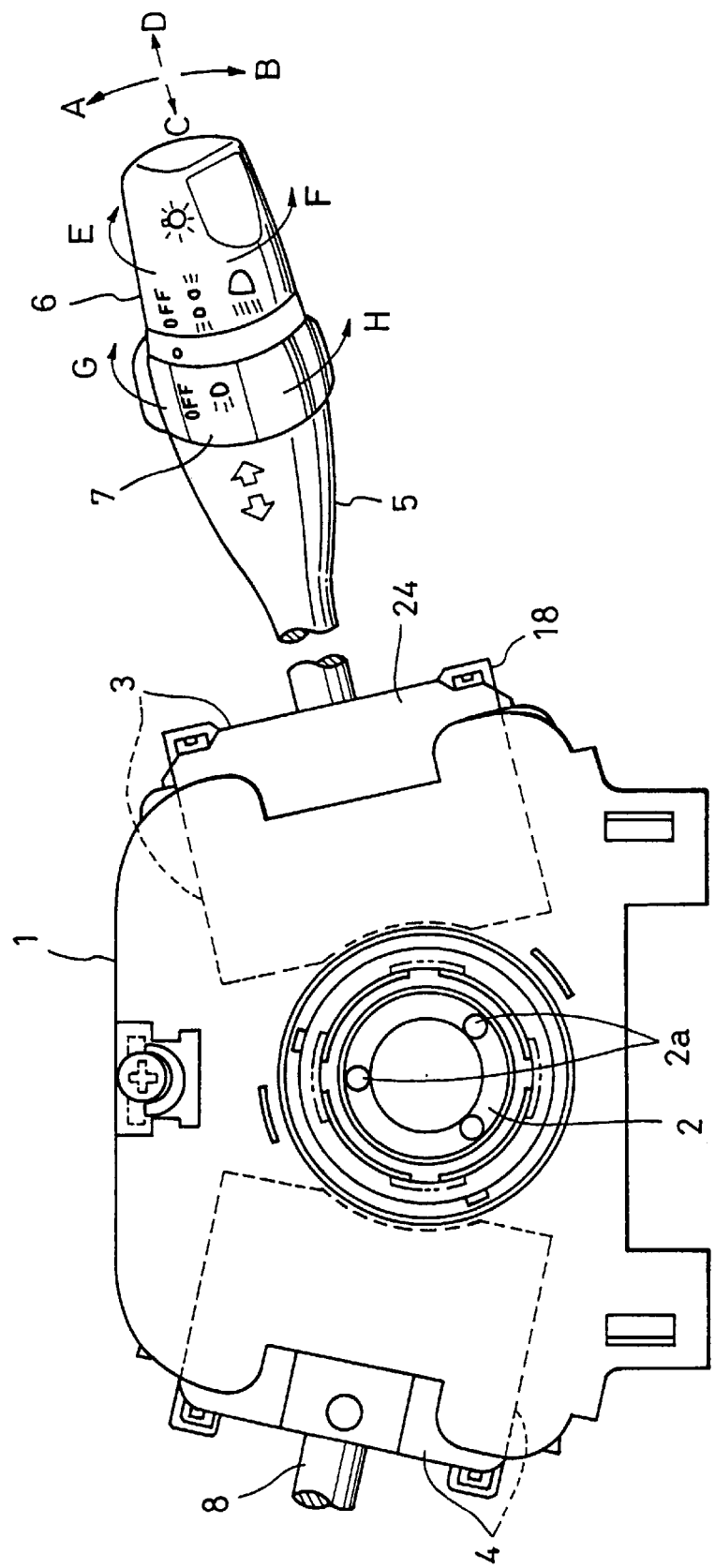
FIG. 1 is a front view, partly in a cross-section, showing a lever switch for a vehicle according to a preferred embodiment of the present invention.

A preferred embodiment of a lever switch apparatus according to the present invention will now be described in detail with reference to FIGS. 1 to 6 of the accompanying drawings A body 1 of a combination switch for an automobile, as shown in FIG. 1, is secured to a steering column (not shown in the figures) by means of screws. The body 1 supports pivotably a cylindrical pipe 2 having a cancel pin 2a at the center. On the right side a first switch 3 and on the left side a second switch 4 are inserted into the body in a transversal direction and mounted thereon The first switch 3 has a function of, for example, a turn signal switch, a passing switch, a main-dimmer switching-over switch, a head lamp switch, and a fog lamp switch. The first switch 3 functions as the turn signal switch, which lightens continuously turn signal lamps, when the manipulation lever 5 is manipulated in a left or right direction indicated by an arrow A or B. The first switch 3 functions as the passing switch, which lightens temporarily head lamps, when the manipulation lever 5 is manipulated upward, as indicated by an arrow C. Further, the first switch 3 functions as the main-dimmer switch, which effects main-dimmer switching-over of the head lamps, when the manipulation lever 5 is manipulated in an upward or downward direction, as indicated by an arrow C or D.

Moreover, the first switch 3 functions as the head lamp switch, which lightens and extinguishes the head lamps and small lamps, when a first pivoting knob 6 disposed at the extremity portion of the manipulation lever 5 is manipulated by pivoting in a direction indicated by an arrow E or F. In addition, the first switch 3 functions as the fog lamp switch, which lightens and extinguishes fog lamps, when a second pivoting knob 7 is manipulated by pivoting in a direction indicated by an arrow G or H.

The second switch 4 supports a manipulation lever 8 pivotably around a shaft. The manipulation lever 8 has, for example, a function of a wiper-washer switch. The manipulation lever 8 can be manipulated forward, backward, upward and downward just as the manipulation lever 5, and is provided with a wiper volume, a rear wiper switch, and so forth, which are pivoting switches, at the extremity portion thereof.

Figure 2:
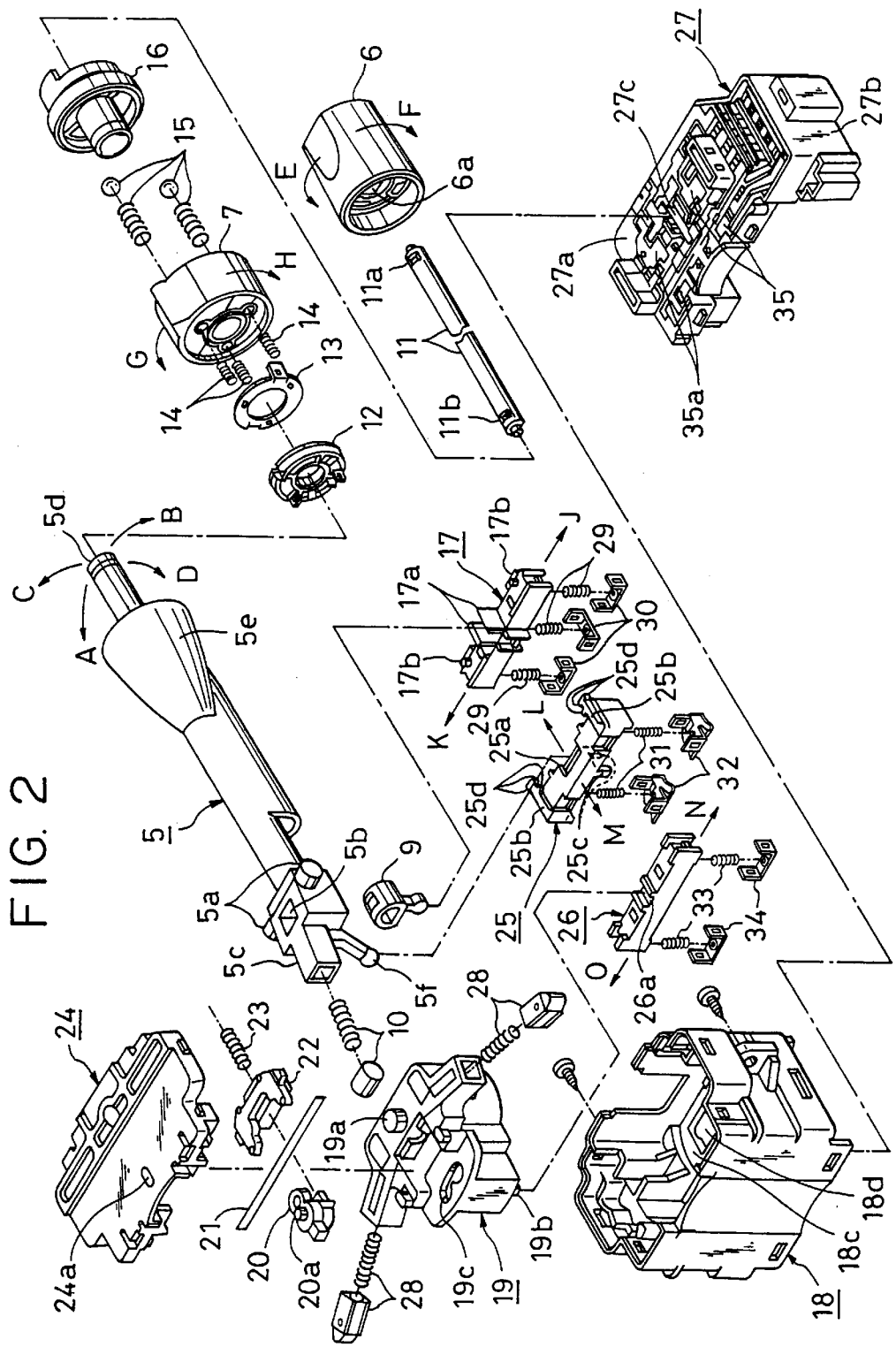
FIG. 2 is an exploded perspective view of the lever switch according to the preferred embodiment of the present invention.

The manipulation lever 5 of the first switch 3 can be pivoted around shafts 5a in the directions indicated by the arrows C and D, as indicated in FIG. 2. The manipulation lever 5 is a manipulation body having approximately a pipe shape, in which a through hole 5b for disposing a manipulation rod 9 is formed in the neighborhood of the shafts 5a. A first pipe portion 5c for disposing a nodular member 10 is formed at an end portion of the manipulation lever 5, while a second pipe portion 5d, into which a shaft is inserted for disposing a base plate 12, a movable contacting piece 13, contact springs 14, a second pivoting knob 7, nodular members 15 and a securing body 16, is formed at the other end portion thereof.

A second manipulation rod 5f, which is freely engaged with an engaging hole 25a formed in a second movable piece 25, is formed in one body with the manipulation lever 5 on the lower side in the neighborhood of the first pipe portion 5c. When the manipulation lever 5 is manipulated in the directions indicated by the arrows C and D, the second movable piece 25 is moved on a straight line in directions indicated by arrows L and M so that the main-dimmer switching-over and the passing are effected, respectively.

The first pivoting knob 6 is secured to the shaft 11 owing to the fact that a shaft hole 6a is formed at the center thereof, and that an elastic engaging nail (not indicated in the figures) formed in an end portion of the shaft hole 6a is engaged with an engaging groove 11a formed in the shaft 11. The manipulation rod 9 is secured to the other end of the shaft 11 and is moved by manipulating the first pivoting knob 6 in a direction indicated by an arrow B or F so as to move a first movable piece 17 on a straight line in a direction indicated by an arrow J or K so as to lighten or extinguish the head lamps.

The second pivoting knob 7 is an approximately doughnut-shaped manipulation body, which lightens or extinguishes the fog lamps by manipulating the knob 7 in directions indicated by arrows H and G, respectively.

The second pivoting knob 7 holds the movable contacting piece 13 through contact springs 14 on the side of a case 18, and nodular members 15 are arranged on the side towards the first pivoting knob 6.

The second pivoting knob 7 is held pivotably by an opening portion 5e opened in a trumpet shape, through which the second pipe portion 5d of the manipulation lever 5 passes, and a fixed body 16 is secured to the second pipe portion 5d.

Figure 3:
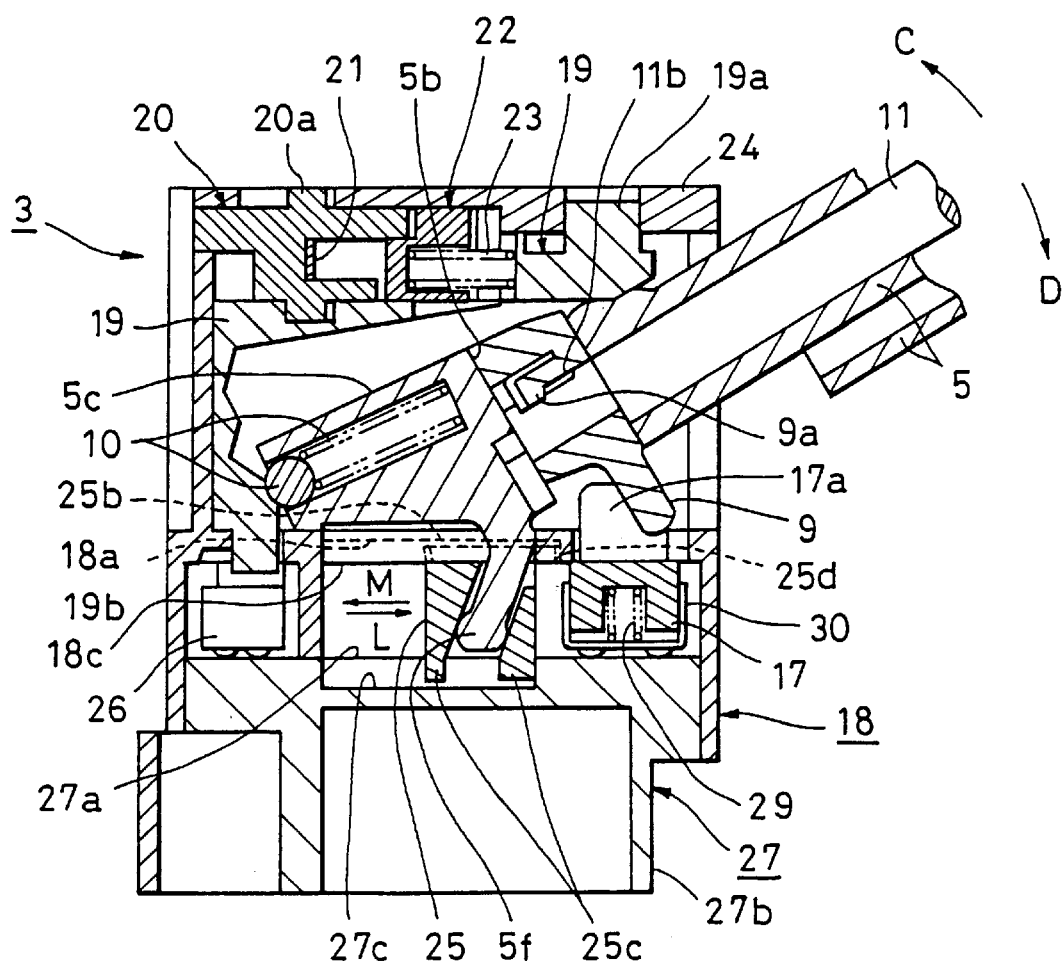
FIG. 3 is an enlarged cross-sectional view of the lever switch according to the preferred embodiment of the present invention.

The manipulation rod 9 is engaged with the shaft 11 at the other end portion thereof by engaging an elastic engaging nail 9a with the engaging groove 11b of the shaft 11, as indicated in FIG. 3. The manipulation rod 9 is pivoted together with the shaft 11 and the first pivoting knob 6, and the pivot movement of the first pivoting knob 6 is transformed into movement on a straight line of the first movable piece 17 to be transmitted thereto owing to the fact that the manipulation rod 9 is engaged with engaging protruding pieces 17a of the first movable piece 17.

The nodular member 10 consists of, for example, a coil spring and a circular cylinder-shaped nodular piece. The nodular member 10 is accommodated in the first pipe portion 5c and brought into contact with a nodular groove 19d formed in an inner wall of a movable plate 19, as indicated in FIG. 3. The base plate 12 has fixed contacts, which are brought into contact with the movable contacting piece 13 and is inserted into the opening portion 5e. Each of the nodular members 15 consists of a coil spring and a steel ball, which are mounted elastically in the second pivoting knob 7. The steel ball of the nodular member 15 is contacted with a nodular groove formed in an inner surface portion of the fixed body 16 on the side towards the second pivoting knob 7.

The first movable piece 17, the second movable piece 25 and another third movable piece 26, all of which are approximately rectangular, are juxtaposed on a surface 27a of a pole plate 27. Movable contacting pieces 30 for the head lamp switch are mounted on the lower surface of the first movable piece 17 through contact springs 29. When the first pivoting knob 6 is manipulated by pivoting, the first movable piece 17 is moved in the directions indicated by the arrows K and 3 on the plate surface 27a of the pole plate 27 together with the contact springs 29 and the movable contacting pieces 30.

Figure 4:
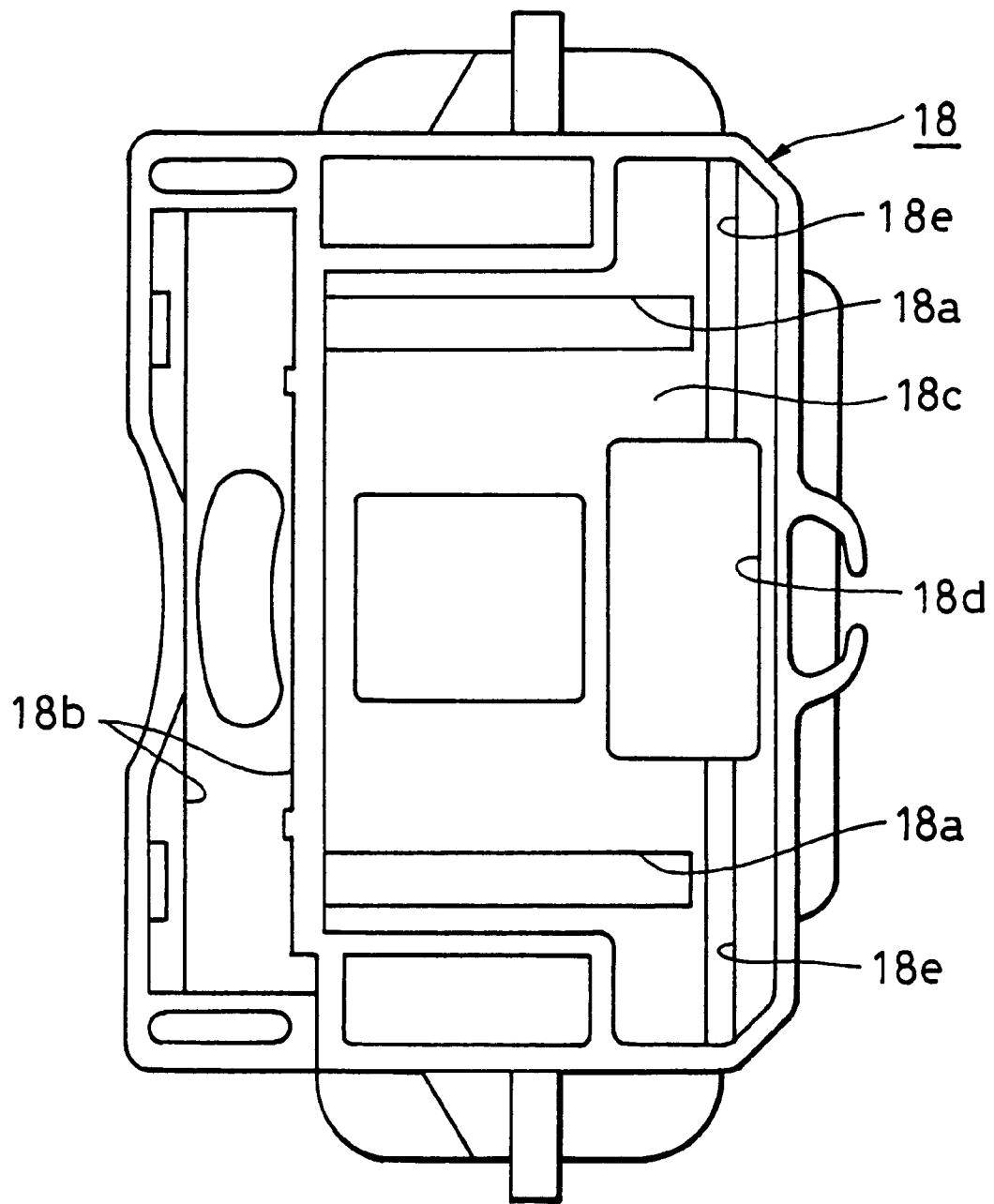
FIG. 4 is an enlarged bottom view of a case for the lever switch according to the preferred embodiment of the present invention.
Figure 5:
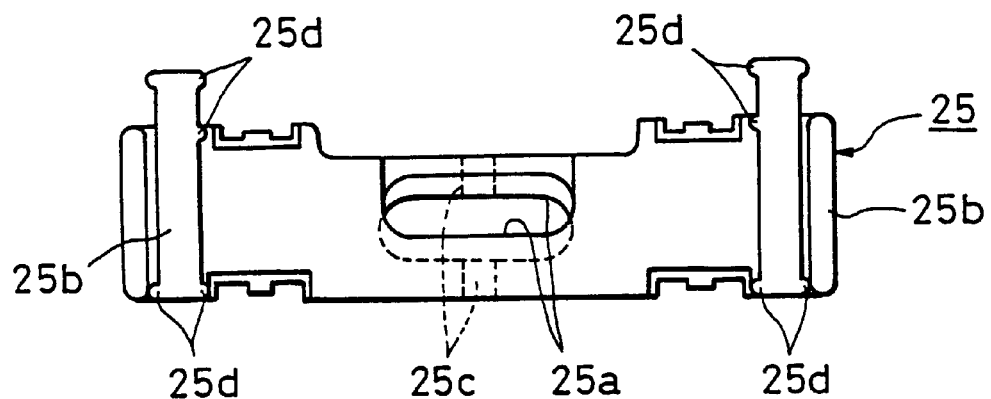
FIG. 5 is an enlarged plan view of a second movable piece for the lever switch according to the preferred embodiment of the present invention.

The engaging protruding pieces 17a are two plate-shaped protrusions formed at the center of an upper surface of the first movable piece 17. The engaging protruding pieces 17a are inserted into a first through hole 18d formed in a partition 18c in the case 18 freely movably in the directions indicated by the arrows J and K. Circular cylinder-shaped protrusions 17b are formed right and left on the upper surface of the first movable piece 17. The protrusions 17b are inserted into a guide groove 18e formed in a lower surface portion of the partition 18c, as indicated in FIG. 4, and are freely movable on a straight line.

The case 18 is closed by a cover member 24 through the movable plate 19, a cancel cam 20, a plate spring 21, a cam guide 22 and a coil spring 23 disposed on an upper surface of the partition 18c. The case 18 is closed by the pole plate 27 through the first movable piece 17, the second movable piece 25 and the third movable piece 26 disposed on the lower surface of the partition 18c. The case 18 accommodates the parts described above and is engaged with the base 1 and secured thereto by means of screws.

Nodular bodies 28 are mounted elastically right and left on the movable plate 19, which is pivoted around a shaft 19a in the directions indicated by the arrows A and B together with the manipulation lever 5. A third manipulation rod 19b engaged with an engaging portion 26a of the third movable piece 26 is formed so as to protrude from a lower end portion of the movable plate 19. When the manipulation lever 5 is manipulated by pivoting in a direction indicated by the arrow A or B, the third movable piece 26 is moved on a straight line in a direction indicated by an arrow N or O, and one of the turn signal lights is lightened continuously The cancel cam 20 has shafts 20a on the upper and lower sides. The lower side shaft 20a is movably inserted into a groove 19c formed in the movable plate 19, while the upper side shaft 20a is movably inserted into an oblong hole 24a formed in the cover member 24. The plate spring 21 is held by the cover member 24 at the two extremities and pushes the cancel cam 20 at the central portion to energize it. The cam guide 22 is disposed on the movable plate 19 and is energized by the coil spring 23 towards the cancel cam 20. The cover member 24 is mounted on the upper side opened end of the case 18 by insertion.

Movable contacting pieces 32 for the main-dimmer switch and the passing switch are mounted on a lower surface of the second movable piece 25 through contact springs 31. When the manipulation lever 5 is manipulated by pivoting in the direction indicated by the arrow C or D, the second movable piece 25 is moved in the direction indicated by the arrow L or M on the plate surface 27a of the pole plate 27 together with the contact springs 31 and the movable contacting pieces 32. The second movable piece 25 is an approximately rectangular form having a shorter side in the directions indicated by the arrows L and M, which are the movement direction of the second movable piece 25.

The engaging hole 25a formed in the second movable piece 25 is an oblong hole formed obliquely, as indicated in FIG. 3. When the manipulation lever 5 is manipulated by pivoting in the direction indicated by the arrow A or B, the second manipulation rod 5f is moved idly in the engaging hole 25a so that the second movable piece 25 does not move. The engaging hole 25a may be either a blind hole or a through hole.

Guide arms 25b are arranged for sliding movement in the sliding groove 18a formed in the lower surface portion of the partition 18c of the case 18. The guide arms 25b prevent the second movable piece 25 from being inclined. The guide arms 25b are bar-shaped members formed in the directions indicated by the arrows L and M, which are movement directions of the guide arms 25b, as indicated in FIG. 2. A plurality of instability preventing protrusions 25d, which are in sliding contact with inner walls of the sliding groove 18a, are formed on the outer and the inner side of each of the guide arms 25b. The stability preventing protrusions 25d are semispherical protrusions formed at four corners on the outer side and on the side opposite thereto of each of the guide arms 25b.

Figure 6:
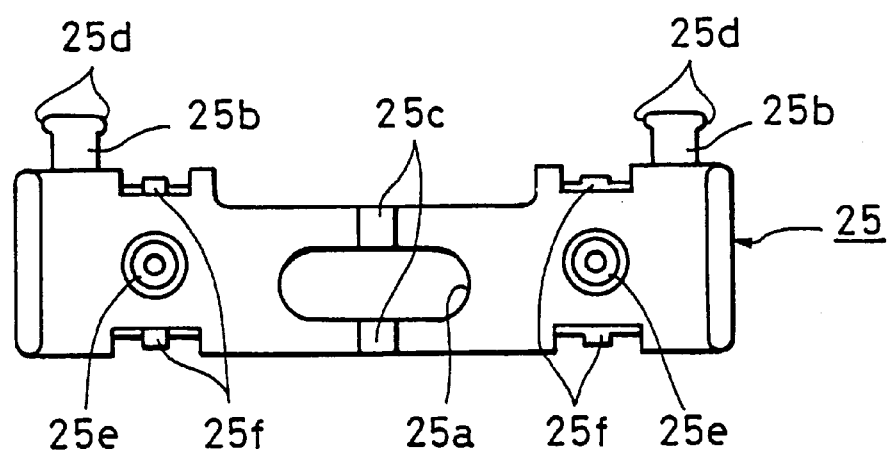
FIG. 6 is an enlarged bottom view of the second movable piece shown in FIG. 5.

Guide protrusions 25c are formed in the movement direction of the second movable piece 25 on both sides of the engaging hole 25a at the center of the lower surface of the second movable piece 25, as indicated in FIG. 6. The guide protrusions 25c are inserted into the guide hole 27c formed on the plate surface 27a so as to be freely movable in the directions indicated by the arrows L and M therein. The second movable piece 25 is guided by the guide arms 25b and the guide protrusions 25c so that it can move without being inclined other than in a desired direction and also without any instability.

In the case where the engaging hole 25a is a blind hole, there may be only one guide protrusion 25c. Each of the two contact springs 31 is inserted into a spring holding hole 25e, as shown in FIG. 6. A nail 25f is provided, with which each of the two movable contacting pieces 32 is engaged.

The third movable piece 26 holds movable contacting pieces 34 for the turn signal switch on the lower surface through contact springs 33. When the manipulation lever 5 is manipulated by pivoting in the directions indicated by the arrows A and B, the third movable piece 26 is moved in the direction indicated by the arrow N or O on the plate surface 27a of the pole plate 27. An engaging portion 26a consists of, for example, two rail-shaped protrusions. When the manipulation lever 5 is manipulated by pivoting in the directions indicated by the arrows C and D, the third manipulation rod 19b is moved idly in the engaging portion 26a so that the third movable piece 26 does not move.

Electrically conductive plates 35 are buried in the pole plate 27, which is made of resin by insert formation. The pole plate 27 is mounted on the opening portion on the lower side of the case 18 by insertion. The first movable piece 17, the second movable piece 25, and the third movable piece 26 are arranged on the plate surface 27a of the pole plate 27. A connector portion 27b is formed in one body with the pole plate 27, and the electrically conductive plates 35 are buried therein by insert formation.

The electrically conductive plates 35 consist of fixed contact plates 35a disposed on the plate surface 27a, and terminals 35b disposed within the connector portion 27b.

The construction of the lever switch according to the preferred embodiment of the present invention has been described above. The action thereof will now be described below in detail.

With the present invention, the space necessary for the lever switch can be reduced, and also the size of the pole plate 27 and the switch case 18 can be reduced owing to the fact that the first movable piece 17, the second movable piece 25, and the third movable piece 26 are slender, and that they are juxtaposed on the plate surface 27a of the pole plate 27. In this way it is possible to make the overall size of the first switch 3 smaller.

When the manipulation lever 5 is manipulated by pivoting in the direction indicated by the arrow A or B, the manipulation lever 5 is pivoted around the shaft 19a so that the third manipulation rod 19b moves the third movable piece 26 on a straight line in the direction indicated by the arrow N or O. The third manipulation rod 19b is moved while being guided by the guiding wall 18b of the switch case 18, and the turn signal switch is turned on so that the left or right side turn signal lamp is lightened continuously.

When the manipulation lever 5 is manipulated by pivot in the direction indicated by the arrow C or D, the manipulation lever 5 is pivoted around the shafts 5a, and the manipulation rod 5f moves the second movable piece 25 in the direction indicated by the arrow L or M. The guide arms 25b are guided by the sliding grooves 18a formed in the case 18, while the guide protrusions 25c are guided by the guide hole 27c formed in the pole plate 27, so that the second movable piece 25 is guided to move in the direction indicated by the arrow L or M without being inclined. In this way, the movable contacting pieces 30, 32 and 34 can move precisely on straight lines and, therefore, it is possible to prevent contact defects with the fixed contact plates 35a.

Owing to the fact that on the second movable piece 25 there are formed the guide arms 25b moving on straight lines in the sliding grooves 18a, and the guide protrusions 25c moving on a straight line in the guide hole 27c, it is possible to reduce the size of the second movable piece 25 in the directions indicated by the arrows L and M, which are movement directions of the main body thereof. In this way, it is possible to juxtapose the three movable pieces 17, 25, 26 on the plate surface 27a of the pole plate 27 and to reduce the size of the pole plate 27, the case 18, and so forth.

Further, owing to the fact that the instability preventing protrusions 25d are formed on the guide arms 25b of the second movable piece 25, even if the pole plate 27 is thermally contracted (for example, when it is solidified during resin formation of the pole plate 27), so that the interval between the two guide arms 25b, 25b is shortened, the instability preventing protrusions 25d are crushed so as to regulate the distance between the two guide arms 25b. In this way, even if the size of the pole plate 27 fluctuates during resin formation, this is corrected by the instability preventing protrusions 25d.

When the first pivoting knob 6 is manipulated by pivoting, the manipulation rod 9 is pivoted together with the shaft 11, and the first movable piece 17 is moved in the direction indicated by the arrow K or J so that the head lamps and side lamps are lightened or extinguished.

Since the present invention is constructed as explained above, the following effects can be obtained.

According to a first aspect of the present invention, a lever switch is provided comprising: a manipulation lever supported pivotably around a shaft in a case; a movable piece moved by pivoting manipulation of the manipulation lever; and a pole plate having a plate surface on which the movable piece is slid, wherein a partition is disposed within the case, sliding grooves are formed in a lower surface portion of the partition in a direction in which the movable piece is moved, and guide arms engaged with the sliding grooves are formed on the movable piece. Due to this construction, it is possible to move the sliding piece only in a desired direction smoothly without swinging on a straight line. In this way, contact defects can be prevented. Therefore, it is possible to reduce the size of the main body of the movable piece in the movement direction thereof and to reduce the size of the case and the pole plate and, hence, the overall size of the first switch.

According to another aspect of the present invention, owing to the fact that instability preventing protrusions, which are in sliding contact with inner walls of each of the sliding grooves, are formed on each of the guide arms, even if the movable pieces are thermally contracted so that errors are produced, they can be supported without any instability.

According to yet another aspect of the present invention, a lever switch is provided comprising: a manipulation lever supported pivotably around a shaft in a case; a movable piece moved by pivoting manipulation of the manipulation lever; and a pole plate having a plate surface on which the movable piece is slid, wherein a guide hole is formed in a portion of the plate surface of the pole plate in a direction in which the movable piece is moved, and guide protrusions engaged with the guide hole are formed in the movable piece. Due to this construction, it is possible to guide the movable piece without being inclined to move on a straight line only in a desired direction. In this way, it is possible to bring the movable contacting pieces into contact with the fixed contacts.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. A lever switch for a vehicle, comprising:
    a manipulation lever (5) supported pivotably around a shaft in a case (18);
    a movable piece (25) which is movable by pivoting manipulation of said manipulation lever (5);
    at least one movable contacting piece (32) mounted on a lower surface of said movable piece (25);
    a pole plate (27) having a plate surface (27a) on which said movable piece (25) is slid; and
    at least one fixed contact plate (35a) disposed on said plate surface (27a) in sliding engagement with said at least one movable contacting piece (32);
    wherein a partition (18c) is disposed within said case (18), sliding grooves (18a) are formed in a lower surface portion of said partition (18c) in a direction in which said movable piece (25) is moved, and a pair of guide arms (25b) engaged with said sliding grooves (18a) are formed on said movable piece (25). said guide arms (25b) each having at least one instability preventing protrusion (25d) protruding from an inner side thereof toward the other guide arm, said protrusions (25d) being in sliding contact with respective inner walls of said sliding grooves (18a).

2. The lever switch for a vehicle according to claim 1, wherein first and second instability preventing protrusions (25d) protrude from an inner side of each guide arm toward the other guide arm, and a third instability preventing protrusion (25d) protrudes from an outer side of each guide arm away from the other guide arm, said first and second instability preventing protrusions being in sliding contact with said inner walls of each of said sliding grooves (18a), and said third instability preventing protrusion being in sliding contact with an outer wall of each of said sliding grooves (18a).

3. The lever switch for a vehicle according to claim 2, wherein a guide hole (27c) is formed in a portion of the plate surface (27a) of said pole plate (27) in a direction in which said movable piece (25) is moved, and guide protrusions (25c) engaged with said guide hole (27c) are formed on said movable piece (25).

4. The lever switch for a vehicle according to claim 1, wherein a guide hole (27c) is formed in a portion of the plate surface (27a) of said pole plate (27) in a direction in which said movable piece (25) is moved, and guide protrusions (25c) engaged with said guide hole (27c) are formed on said movable piece (25).

5. A lever switch for a vehicle, comprising:
    a manipulation lever (5) supported pivotably around a shaft in a case (18);
    a movable piece (25) moved by pivoting manipulation of said manipulation lever (5);
    at least one movable contacting piece (32) mounted on a lower surface of said movable piece (25):
    a pole plate (27) having a plate surface (27a) on which said movable piece (25) is slid; and
    at least one fixed contact plate (35a) disposed on said plate surface (27a) in sliding engagement with said at least one movable contacting piece (32);
    wherein a guide hole (27c) is formed in a portion of the plate surface (27a) of said pole plate (27) in a direction in which said movable piece (25) is moved, and guide protrusions (25c) engaged with said guide hole (27c) are formed on said movable piece (25).

6. A lever switch for a vehicle, comprising:
    a manipulation lever (5) supported pivotably around a shaft in a case (18), said manipulation lever (5) having a first pivoting knob (6) supported thereon;
    a first movable piece (17) which is movable by pivoting manipulation of said first pivoting knob (6);
    a second movable piece (25) which is movable by pivoting manipulation of said manipulation lever (5) in a first direction (C, D);
    a third movable piece (26) which is movable by pivoting manipulation of said manipulation lever (5) in a second direction (A, B), said second direction being approximately perpendicular to said first direction (C, D);
    a pole plate (27) having a plate surface (27a) on which said first, second, and third movable pieces (17, 25, 26) are slid;
    wherein a partition (18c) is disposed within said case (18), sliding grooves (18a) are formed in a lower surface portion of said partition (18c) and extend in a direction in which said second movable piece (25) is moved, and guide arms (25b) engaged with said sliding grooves (18a) are formed on an upper portion of said second movable piece (25);
    wherein instability preventing protrusions (25d), which are in sliding contact with inner walls of each of said sliding grooves (18*a*), are formed on and protrude from each of said guide arms (25*b*);

wherein an elongated guide hole (27*c*) is formed in a portion of the plate surface (27*a*) of said pole plate (27) and extends in the direction in which said second movable piece (25) is moved, and guide protrusions (25*c*) engaged with said guide hole (27*c*) are formed in said second movable piece (25); and wherein said first, second, and third movable pieces (17, 25, 26) are positioned side-by-side within said case (18) and each have a movable contacting piece (30, 32, 34) for sliding engagement with respective fixed contact plates (35*a*) on said pole plate (27), said second movable piece (25) being positioned between said first and third movable pieces (17, 26), and said first and third movable pieces (17, 26) each having a direction of movement which is generally perpendicular to the direction of movement of the second movable piece (25).

* * * * *